United States Patent [19]

Bailey

[11] 4,111,047

[45] Sep. 5, 1978

[54] HYDROSTATIC HEAD PRESSURE MONITOR WITH REMOTE READOUT

[75] Inventor: John M. Bailey, Houston, Tex.

[73] Assignee: Monitoring Systems Inc., Thibodaux, La.

[21] Appl. No.: 758,824

[22] Filed: Jan. 12, 1977

[51] Int. Cl.² ............................................. G01F 23/16
[52] U.S. Cl. ...................................... 73/302; 73/715; 137/843
[58] Field of Search .................... 73/302, 299, 207; 137/843, 847; 251/5

[56] References Cited

U.S. PATENT DOCUMENTS

| | | | |
|---|---|---|---|
| 141,587 | 8/1873 | Painter | 137/847 |
| 1,631,909 | 6/1927 | Badin | 73/302 |
| 1,898,848 | 2/1933 | O'Brien | 73/302 |
| 2,662,724 | 12/1953 | Kravagna | 137/847 |
| 3,360,002 | 12/1967 | Weis et al. | 251/5 X |
| 3,377,857 | 4/1968 | Moscarini | 73/207 |
| 3,441,245 | 4/1969 | Holland et al. | 251/5 |
| 3,463,179 | 8/1969 | Hrdina | 251/5 |
| 3,638,490 | 2/1972 | Buettner | 73/302 X |
| 3,872,886 | 3/1975 | Shotmeyer | 73/299 |
| 4,019,387 | 4/1977 | Siegel | 73/299 |

*Primary Examiner*—Daniel M. Yasich

*Attorney, Agent, or Firm*—Wilkinson, Mawhinney & Theibault

[57] ABSTRACT

The present disclosure is directed to a fluid line pressure monitor insertable in a pipe line having a pressure side and a vent side. The monitor comprises a pair of strip members joined along their longitudinal edges and the ends of the monitor being passed over the ends of a break in the pipe line. The inside of the strip members is subjected to the pressure of the fluid being passed through the pipe and the outside of the strips being subjected to the hydrostatic pressure in a receptacle or pressure within a chamber which is pressurized from a source to be monitored. The strips may be both of an elastomeric material or a flexible metallic material or a combination of one elastomeric material and one flexible metallic material so long as the two strips are fused along their longitudinal length and fit snugly about the ends of a pipe through which a fluid flow passes from a pressure side to a vent side. The monitor is placed in a receptacle at a fixed distance above the bottom and subjected to a hydrostatic head which may vary with the fluid depth in the receptacle. Upstream of the monitor is a gauge or chart recorder which will measure the effect of the hydrostatic head in the receptacle on the monitor relative to the pressure passing through the monitor from pressure fluid passing through the pipe line.

9 Claims, 5 Drawing Figures

HYDROSTATIC HEAD PRESSURE MONITOR WITH REMOTE READOUT

An object of the present invention is the provision of a monitor made of flexible strips which may be inserted in a fluid flow line and subjected to the pressure passing through a fluid pipe line on its inside and subjected to a hydrostatic pressure on the outside of the monitor caused by fluid pressure changes in a receptacle the head of which it may be desired to either maintain constant or vary under controlled conditions.

Another object of the present invention is to provide a monitor of two rectangular strips fused along the longitudinal edges leaving the area between the fusion points free to expand and permit passage of a fluid therebetween when the two ends of the monitor are in firm fluid sealing engagement with the ends of a pipe by any suitable well known securing means such as hose clamps.

A further object of the present invention is to provide a monitor insertable into a break in a fluid line which may be made of two elastomeric strips or two thin flexible strips or one of each so long as they are fused, bonded or joined along their longitudinal edges and free to respond to pressure on the inside from the fluid line and free to sense pressure changes on the outside from a hydrostatic head the height of the liquid of which is to be monitored.

A still further object of the present invention is to provide a monitor as described above which may be placed in a chamber which is pressurized in its interior with a fluid pressure either gaseous or liquid which it is desired to monitor.

With the foregoing and other objects in view the invention will be more fully described hereinafter and more particularly pointed out in the appended claims.

In the drawings in which like parts are denoted by reference characters throughout the several views:

FIG. 5 is a transverse section of a modified monitor consisting of flexible metallic strips with no fluid passing there between.

Figure 1:
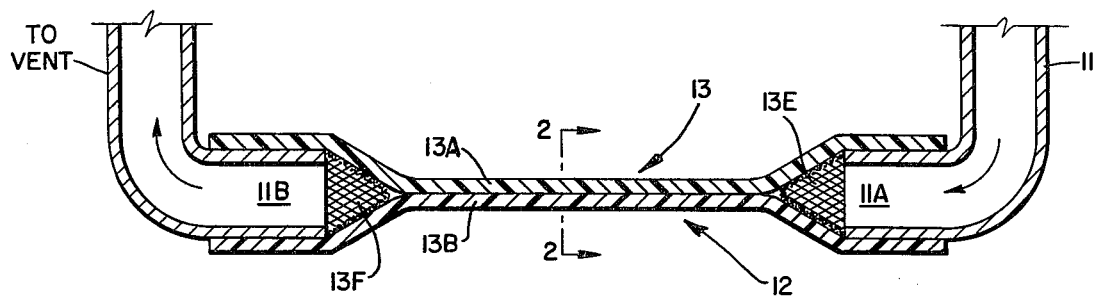
FIG. 1 is a longitudinal sectional view of the fluid line pressure monitor of the present invention installed in a break in a pipe line of a fluid system.

Referring now to the drawings, 10 designates a fluid system having a pipe line 11 having a break 12 into which the monitor 13 of the present invention is inserted. The monitor 13 is secured at a predetermined depth in a receptacle 14 having a liquid 15 the hydrostatic head of which is to be monitored. The pipe line has a gauge or chart recorder 16 at its upstream side and a vent 17 downstream of the monitor. A conventional purging air valve, such as Moore Products model No. 62VNA, is shown at 9 in pipe line 11.

Figure 2:
FIG. 2 is a transverse section of the monitor showing the fused longitudinal edges with no fluid passing between the flexible strips.
Figure 3:
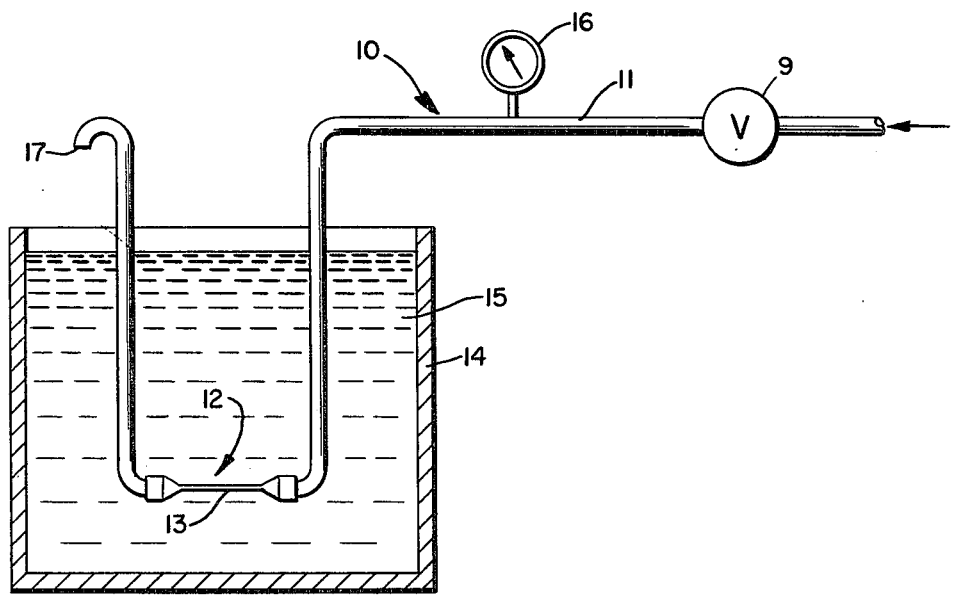
FIG. 3 is a diagrammatic view of the monitor of the present invention inserted in a fluid pressure line at a fixed depth in a receptacle the hydrostatic head of which is to be measured.

Referring now to FIGS. 1 and 2, the monitor 13 is shown at enlarged scale as comprising two elastomeric strips 13A and 13B, rectangular in shape fused, bonded or secured along their long sides 13C and 13D. The free ends of the monitor are snugly fit over the ends 11A and 11B of the pipe line 11 so that the fluid head from 11A will force the strips 13A and 13B apart as the fluid in the system passes from the pressure side of the system to the vent 17.

The hydrostatic pressure of the fluid 15 in the receptacle 14 will act upon the outside of the elastomeric strips tending to increase or decrease fluid flow through the monitor dependent upon the height of liquid 15 in the receptacle 14. When the pressure on the outside of the monitor strips 13A, 13B restricts internal flow of fluid through the line 11 pressure will build up in the supply line until the pressure in the line 11 equals the external pressure on the monitor, at which point external pressure will no longer be able to stop the flow. Thus flow will resume and pressure in the line 11 will remain equal to the external pressure. Any changes in external pressure will be matched by the pressure in the fluid supply line 11 and will be indicated on the guage 16. The pressure indicated on the gauge will always be a true reading of the pressure which is desired to be monitored. The receptacle 14 could be for example a mud pit at an oil well drilling site the level of which it is desired to monitor and this is accomplished by measuring the hydrostatic head at a fixed point above the bottom of the pit or receptacle.

Figure 4:
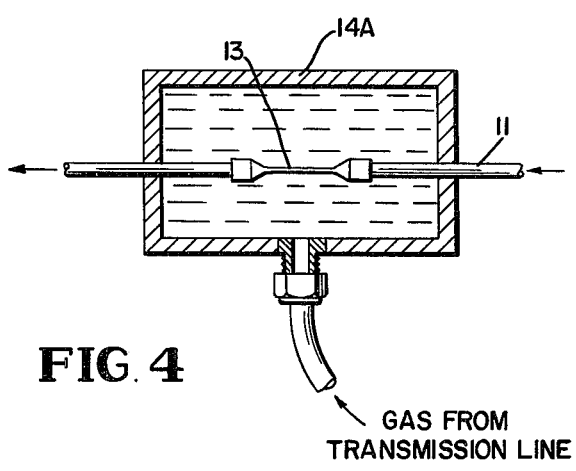
FIG. 4 is a diagrammatic view of a modified use of the present invention wherein the outside of the monitor is subjected to a variable fluid pressure it is desired to monitor.

The modified use of the monitor 13 as shown in FIG. 4 may be employed by subjecting the inside of the receptacle 14A to the pressure in a gas line to detect rise or fall in pressure on a natural gas line often found in oil producing areas.

The monitor 13 while being made of elastomeric strips for a low pressure operation, such as mud pits could be applied to high pressure uses by employing thin flexible metallic strips or combinations of either so long as they are fused along their longitudinal edges.

Filter screens 13E and 13F may be employed to avoid foreign matter lodging between the strips 13A, 13B whether they be elastomeric or metallic.

Figure 5:
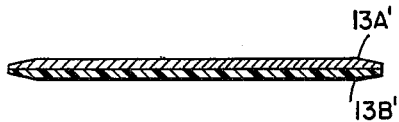

A modified monitor is shown in FIG. 5, differing only from the structure of FIG. 2 in that the flexible strips 13A' and 13B' are thin flexible metallic strips. Also, one elastomeric strip 13A' could be used with one metallic strip 13B', for example.

What is claimed is:

1. A fluid line pressure monitor with remote readout for use in a fluid pressurized system having a pipe line through which a fluid flow passes to a connected vent line comprising:
    (a) a flexible diaphragm of two rectangular flexible members having their edges fused together along their length and maintained in a normally collapsed state in absence of fluid flow,
    (b) the ends of a break in the pipe line being inserted into opposite ends of said diaphragm, so that the fluid flow passes through the inside of and between said two flexible members,
    (c) pressure indicating means in fluid circuit with the pipe line upstream of said flexible diaphragm,
    (d) receptacle means containing a fluid the hydrostatic head of which is to be monitored, and
    (e) means positioning said flexible diaphragm at a fixed level above the bottom of said receptacle to make the outside of said diaphragm responsive to a preselected hydrostatic head of the liquid in said receptacle.

2. A fluid line pressure monitor as claimed in claim 1 wherein said flexible diaphragm comprises two rectangular elastomeric strips fused together along their length at their edges only.

3. A fluid line pressure monitor as claimed in claim 1 wherein said flexible diaphragm comprises two rectangular flexible strips fused together along their length at their edges only, one strip being of elastomeric material and the other strip being of metallic material.

4. A fluid line pressure monitor as claimed in claim 1 wherein said flexible diaphragm comprises two rectangular flexible strips of metallic material fused along their length at their edges only.

5. For use with a receptacle containing a fluid the hydrostatic head of which is to be monitored, having a pressure fluid pipe line with remote readout and having a run positioned a selected distance above the bottom of said receptacle through which a fluid flow passes to a vent line, a fluid line pressure monitor inserted in said fluid line in firm sealing engagement therewith in said run a fixed distance above the bottom of the receptacle comprising a flexible diaphragm of two rectangular flexible members fused together along their length at their edges only and maintained in a normally collapsed state in absence of fluid flow.

6. A fluid line pressure monitor as claimed in claim 5 wherein said flexible diaphragm comprises two rectangular elastomeric strips fused together along their length at their edges only.

7. A fluid line pressure monitor as claimed in claim 5 wherein said flexible diaphragm comprises two rectangular flexible strips fused together along their length at their edges only, one strip being elastomeric material and the other strip being of metallic material.

8. A fluid line pressure monitor as claimed in claim 5 wherein said flexible diaphragm comprises two rectangular flexible strips of metallic material fused along their length at their edges only.

9. A fluid line pressure monitor as claimed in claim 5 further comprising screen means at each end said flexible diaphragm.

* * * * *